United States Patent [19]
Fruit

[11] 3,780,589
[45] Dec. 25, 1973

[54] PRECISION PRESSURE MANOMETER
[75] Inventor: Jerry L. Fruit, Houston, Tex.
[73] Assignee: Mensor Corporation, Houston, Tex.
[22] Filed: Sept. 12, 1972
[21] Appl. No.: 288,259

Related U.S. Application Data
[62] Division of Ser. No. 134,607, April 16, 1971, Pat. No. 3,707,868.

[52] U.S. Cl. .................................. 73/418, 73/398 R
[51] Int. Cl. .............................................. G01l 7/04
[58] Field of Search .................. 73/418, 398 R, 411

[56] References Cited
UNITED STATES PATENTS
3,067,617  12/1962  Buck ..................................... 73/418
3,286,529  11/1966  Damrel, Jr. et al. .............. 73/398 R

*Primary Examiner*—Donald O. Woodiel
*Attorney*—Tom Arnold et al.

[57] ABSTRACT

A design Bourdon tube manometer, wherein tube deflection is detected by sensing the arc subtended by a light beam reflected from a mirror on the Bourdon tube, has a fixed light source and a null reading reflected beam detector. The Bourdon tube itself is mounted on a mounting member which is selectively movable with respect to a frame member on which is mounted the null reading detector. This permits linearizing the response of the instrument. Initially, the range of the instrument is adjusted by moving the mirror parallel to the source light beam to produce a readout corresponding to the upper limit of the pressure range desired to be measured. Then the mirror is moved perpendicular to the source light beam to produce a linear response at a point at approximately the mid-point of such range.

6 Claims, 12 Drawing Figures

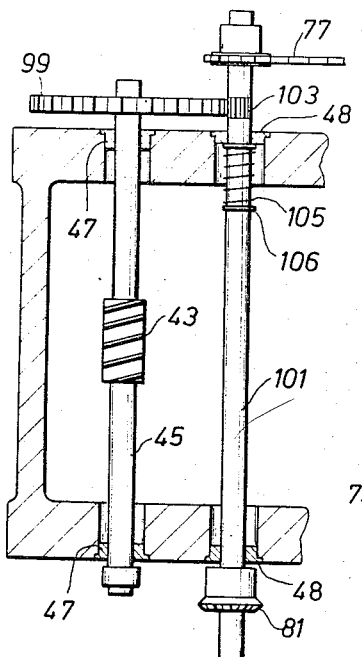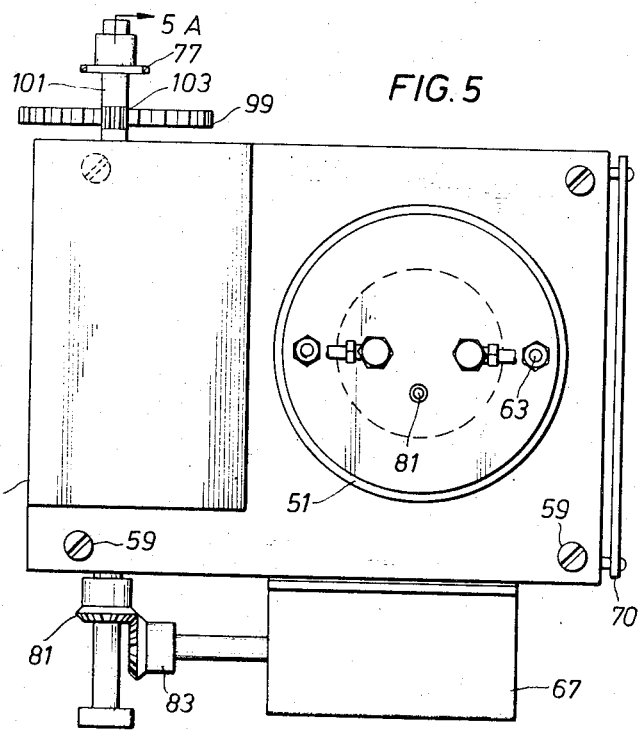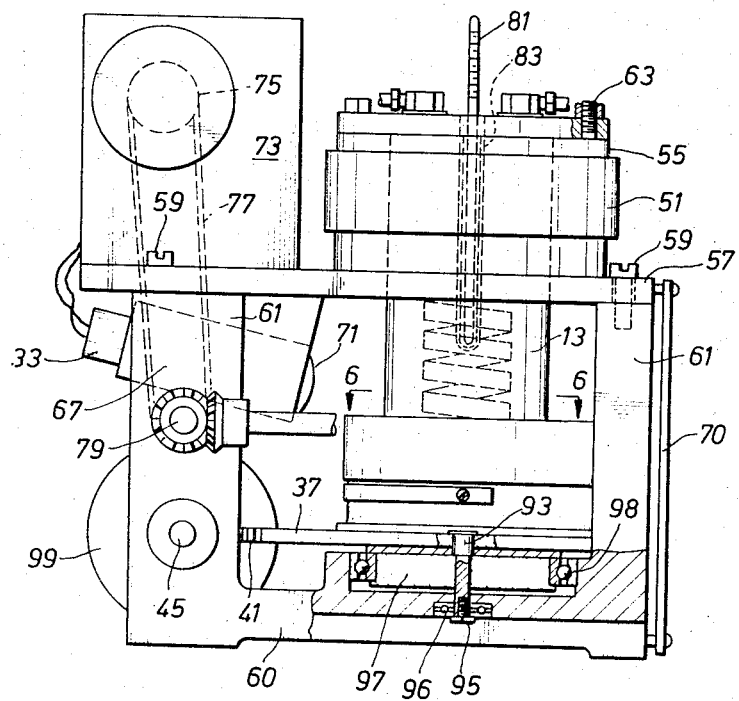

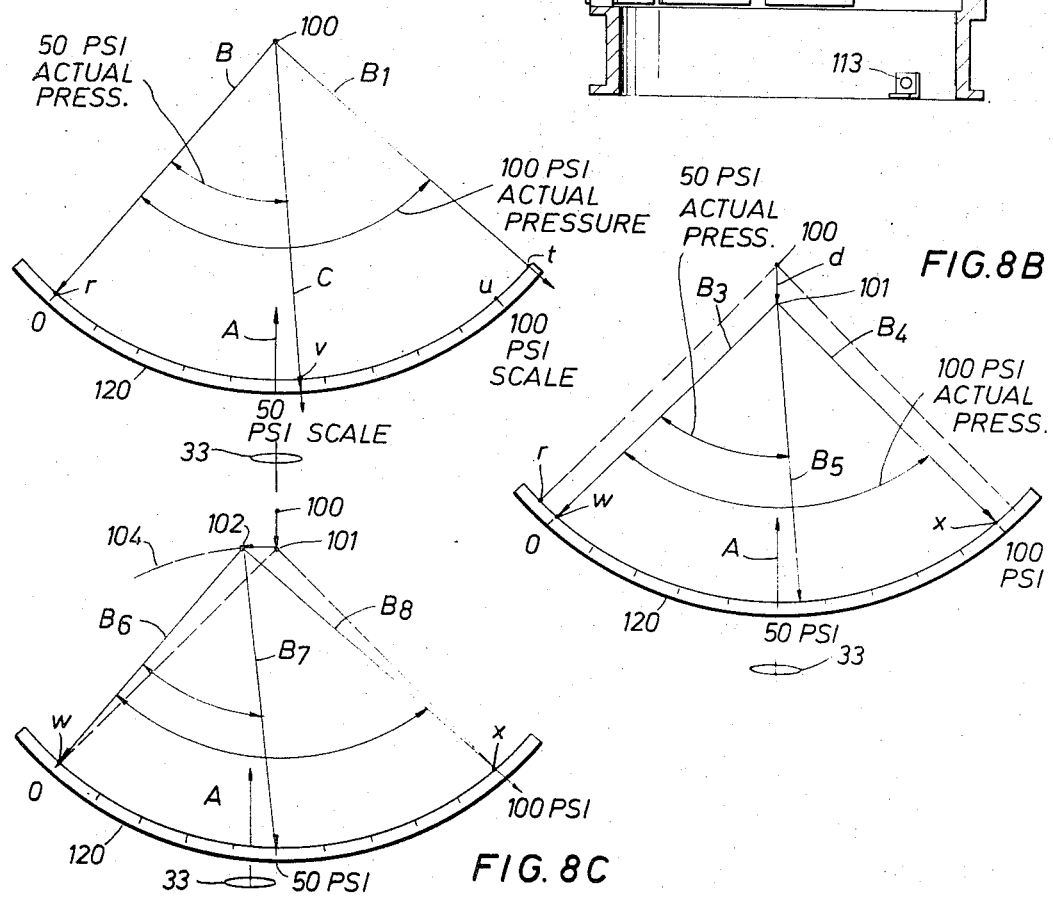

PRECISION PRESSURE MANOMETER

RELATED APPLICATIONS

This application is a divisional application of Ser. No. 134,607, filed Apr. 16, 1971 in the name of Jerry L. Fruit as inventor, and entitled "Precision Pressure Manometer, now U.S. Pat. No. 3,707,868."

BACKGROUND OF THE INVENTION

The instant invention relates to precision pressure measuring devices. More particularly, the instant inventin provides a novel Bourdon tube manometer and further provides a method of adjusting the novel design manometer to achieve a substantially linear response over a preselected range. The method of this invention can be likewise applied to adjust the linearity of other instruments which have optical readout systems wherein a measurement is effected by measuring the deflection of a mirror or the like.

The Bourdon tube has long been known as a pressure measuring device. Basically, a Bourdon tube comprises a length of coiled or twisted tubing having a flattened cross section. The tube is formed into the shape of a C-spring, a helix or the like with one end fixed and the other end free to deflect. A pressure differential introduced across the walls of the tube causes the coiled or twisted tube to change shape as a function of pressure, and this change of shape can be detected at the free end.

For extreme precision pressure measuring devices, fused quartz Bourdon tubes have been found useful. Quartz provides a nearly ideal spring because of its near perfect elasticity and the absence of hysteresis or creep in quartz springs. Although it will be appreciated that the instant invention can be adapted for use with a variety of Bourdon tube pressure gauges, it will also be apparent that a helical quartz Bourdon tube is preferred in the high precision instruments of this invention.

A precision quartz Bourdon tube manometer is disclosed in U.S. Pat. No. 3,286,529. In that patent there is described a manometer having an optical system to detect Bourdon tube deflection whereby a light beam is reflected from a mirror attached to the free end of the Bourdon tube to determine the amount of deflection of the mirror. This method of measuring tube deflection minimizes frictional and inertial forces.

In the manometer disclosed in the mentioned patent, a source light beam impinges upon a mirror attached to the free end of the Bourdon tube and is reflected to a light-sensitive detector which gives a null reading when the system is in equilibrium. Upon application of pressure across the walls of the Bourdon tube, the tube deflects producing an angular rotation of the mirror, and a suitable mechanism drives the light-sensitive detector to once again intercept the reflected beam at the null reading position. A readout mechanism then produces a digital response corresponding to the length of the arc subtended by the reflected beam from its original position to its new position. This arc is functionally related to the pressure differential across the walls of the Bourdon tube. In the mechanism disclosed in U.S. Pat. No. 3,286,529, the source light beam rotates with the photocells so that when the mechanism is reading null, whether at rest or after application of pressure, the light source is in the same position relative to the photocells intercepting the reflected beam. Hence, when the instrument is reading null, the light beam is always perpendicular to the mirror.

Despite the advantages of quartz as a spring material for precision manometers, the response of a quartz helix Bourdon tube over typical ranges desired to be measured, e.g., 0-to-100 psi, is slightly nonlinear. Other materials also give nonlinear responses. Nonlinearity of spring materials results from the fact that as various spring materials are deformed by pressure, they may become more resistant or less resistant to additional deformation by equal additional increments of pressure.

Consequently, it has heretofore been necessary in the art to calibrate each pressure instrument individually against highly accurate reference pressures and to provide a correction chart with each instrument so that the operator could apply correction factors necessary to translate instrument response to true pressure at each readout pressure in the range to be measured.

It would accordingly be highly desirable if there could be provided a highly accurate Bourdon tube manometer which would also demonstrate a substantially linear response within acceptable limits of error.

SUMMARY OF THE INVENTION

There is accordingly provided by this invention a novel Bourdon tube pressure manometer which utilizes an optical detection system and a fixed light source, which manometer may be adjusted to provide a substantially linear readout over a preselected range.

There is further provided in accordance with this invention a novel method of adjusting such a manometer or a like operating instrument to produce a substantially linear response over such a preselected range within acceptable limits of error.

The novel monometer of this invention utilizes a helical Bourdon tube pressure gauge having a mirror mounted thereon adapted to deflect upon application of a pressure differential across the walls of the Bourdon tube, a light sensing system for measuring the angular deflection of the mirror by detecting the arc subtended by a light beam reflected from the mirror upon deflection. The light sensing system includes a light source fixed with respect to the deflecting mirror on the Bourdon tube which light source directs a light beam at the mirror, and a photosensitive light detector which is adapted to rotate to intercept the reflected light beam at null reading position.

In a further important and novel structural feature, the assembly of the instrument is such that the position of the mirror with respect to the photosensitive means can be adjusted. The adjustable feature permits changing of the distance between the mirror and the light sensing system in directions parallel to and perpendicular to the source of light beam. By changing this distance the size of the arc subtended by the beam reflected from the mirror can be changed while the source beam remains stationary, and the instrument can be adjusted as provided below to give a substantially linear response.

Structurally, the novel manometer of this invention comprises a frame, a helical pressure gauge having a fixed end and a free end with a mirror mounted on the free end, a first means mounting the helical pressure gauge with respect to the frame, a light source fixedly mounted on said first means for impinging a source light beam on the mirror, a light sensing system, rotatably mounted with respect to the frame for detecting the length of the circular arc subtended by a reflected beam from the mirror upon application of pressure across the pressure gauge, and means mounting said first means with respect to said frame to permit selective movement of the pressure gauge and mirror, and the light source relative to the sensing system, to adjust the size of the arc subtended by the reflected beam from the mirror, such movement being in directions substantially parallel to the source light beam and perpendicular to the source light beam.

The novel method of this invention involves calibrating such a fixed light source Bourdon tube manometer for a substantially linear response over a preselected range, which method involves applying to the Bourdon tube pressure gauge a first reference pressure corresponding to the upper pressure of such preselected range; detecting the arc subtended by the reflected beam from the reflector means mounted on the Bourdon tube pressure gauge as a result of such first reference pressure, moving the mirror or other reflector means on the Bourdon tube parallel to the source beam to change the size of the arc subtended by the reflected beam to produce a readout corresponding to the first reference pressures, applying to the Bourdon tube a second reference pressure at which the readout differs substantially from the second reference pressure and moving the mirror transversely to the source beam to produce a readout corresponding to the second reference pressure, such movement being effected as to not change the size of the arc subtended by the Bourdon tube pressure gauge while under such first reference pressure. If the instrument is to be as an absolute pressure measuring device, then the first pressure applied will be the lowest reduced pressure desired to be measured by the device. The object is to apply initially a differential pressure across the Bourdon tube which corresponds to the pressure differential which it is desired will produce a full scale response.

It may be stated that this method of calibrating a nonlinear responding pressure gauge is accomplished essentially by introducing an additional nonlinear factor into the system by movement of the mirror. This is not to suggest that the mirror adjustment can be made to compensate completely for the nonlinearity of the Bourdon tube pressure gauge at all pressures, but as will become apparent from the following disclosures, the adjustments made in accordance with the novel method of this invention will enable one to reduce the nonlinearity of the response of an instrument such as described herein to within acceptable limits.

The adjustments provided by the novel method of this invention cannot be made utilizing the prior art device of the patent mentioned above. In that apparatus, the light source moves with the light sensitive detector so that at the null reading position, the reflected beam is essentially a direct reflection from a mirror perpendicular to the source beam. With such a device, mirror adjustment as provided herein does not enable linearization of the instrument.

BRIEF DESCRIPTION OF THE DRAWINGS

The instant invention will be more particularly understood by reference to the accompanying drawings which illustrate specific embodiments of the invention.

FIG. 4 is an elevational view of a portion of a manometer apparatus in accordance with a specific embodiment of this invention.

FIG. 5 is a top view of the portion of the manometer apparatus shown in FIG. 4.

FIG. 5A is a front view of the apparatus shown in FIG. 5 depicting the detail of the gear arrangement.

FIG. 6 is a top view of the light sensitive detector taken along line 6—6 of FIG. 4.

FIG. 7 is a sectional view of the light sensitive detector along line 7—7 showing the path of the source beam and reflected beam in typical operation of an embodiment of this invention.

FIGS. 8A, 8B, and 8C are schematic drawings illustrating how substantial linearization of a novel manometer in accordance with this invention may be accomplished in accordance with the novel method of the invention.

FIG. 9 is an illustration of a graph showwng the nonlinearity of response of a manometer device after range adjustment in accordance with this invention has been made.

DESCRIPTION OF THE SPECIFIC AND PREFERRED EMBODIMENTS

Figure 1:
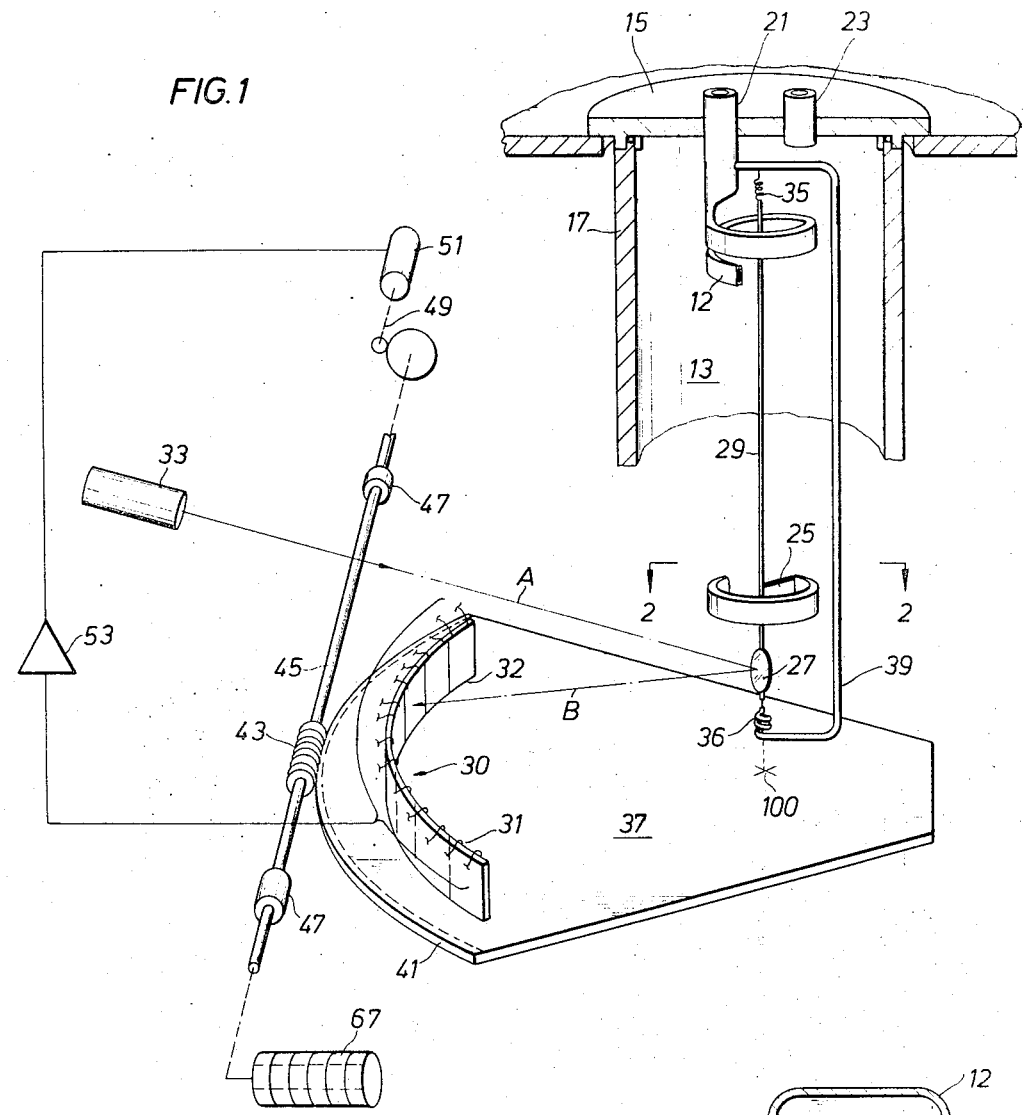
FIG. 1 is a perpsective schematic view showing the essential operating components of a Bourdon tube manometer in accordance with a specific embodiment of this invention.

Referring generally to FIG. 1, there is illustrated schematically a Bourdon tube manometer in accordance with the preferred embodiment of this invention. Generally illustrated in FIG. 1 is a sealed Bourdon tube at 12 which is provided with a mirror 27 at the lower free end thereof. A light beam A directed at the mirror from a fixed light source 33 is reflected from the mirror, and the reflected beam B is intercepted by a photosensitive detector 30 on a rotatable table 37. Table 37 is driven by a suitable servo mechanism to both intercept the reflected beam and to produce a readout on digital counter 67 corresponding to the arc subtended by the reflected beam.

Figure 3:
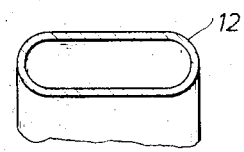
FIG. 3 is a transverse cross-sectional view of the pressure gauge showing its flattened cross-section.

More specifically, with reference to FIG. 1, Bourdon tube 12 is a helical spring member, preferably quartz, having a flattened cross section as illustrated at FIG. 3. Bourdon tube 12 is mounted within sealed chamber 13 which is composed of end pieces such as 15 (the lower end piece is not shown) in a pressure-sealing relationship with transparent cylinder wall 17 which is typically made of glass. A suitable pressure-tight seal may be effected using O-rings or the like in a manner that will be appreciated by those skilled in the art.

Within the sealed chamber 13, the upper end of Bourdon tube 12 is held in fixed position by and is flow-connected with Bourdon inlet tube 21 which extends through the wall of end piece 15 and is desirably provided with a suitable pressure fitting (not illustrated) to maintain the pressure-tight integrity of chamber 13. Similarly, tube 23 is pressure-fit through end piece 15 and communicates with the volume outside the Bourdon tube and within cylinder 13.

Thus, the pressure to be measured may be applied to the interior of Bourdon tube 12 while the exterior of the tube is subjected to a reference pressure (which may be a vacuum or a pressure up to 150 psi or more) or to ambient atmospheric pressure within the sealed chamber 13 through tube 23. Since the Bourdon tube will respond by rotating its free end to a pressure differential across its walls, the Bourdon tube may also be used as an absolute pressure measuring device, preferebly by permanently evacuating the Bourdon tube through tube 21 and applying the pressure to be measured to the exterior of the Bourdon tube within chamber 13 through tube 23. Typically, an oppositely wound Bourdon tube is used in absolute pressure devices to accommodate the readout mechanism of the instrument and facilitate interchangeability of Bourdon tubes.

Figure 2:
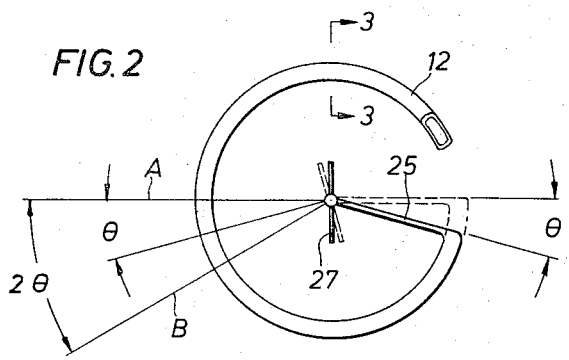
FIG. 2 is a sectional view of the helical pressure gauge along line 2—2 of FIG. 1 to show the disposition of the mirror with respect to the pressure gauge.

As may be seen in FIG. 2, upon application of a pressure differential across the walls of the Bourdon tube, the lower end of the Bourdon tube moves in an arcuate path through an angle $\theta$ which is functionally related to the pressure differential. The rotation of the end of the Bourdon tube through angle $\theta$ is a factor which is measured by the manometer apparatus. Accordingly, mirror 27 is mounted on a suitable stabilizing rod 29, advantageously also composed of fused quartz, which rod is freely rotatable on quartz filament hinges 35 and 36. These hinges may be formed by application of localized heat to the rod to draw down these portions to a filament or reduced diameter to permit virtually frictionless rotation. A support rod 39 is affixed at its upper end to Bourdon inlet tube 21 and suspends stabilizing rod 29. The lower end of the Bourdon tube is coupled to the rod 29 by means of radial member 25, also composed of quartz so that the movement of the lower end of the Bourdon tube causes the rod to rotate on its axis and produce a deflection of the mirror.

As a result of the mounting shown, the entire Bourdon tube apparatus is mounted from end plate 15, thus facilitating the insertion of the entire Bourdon tube apparatus within sealed cylinder 13. Removable fittings, of course, would be used to seal the Bourdon tube within the cylinder. Although these are not illustrated, they can be readily fashioned by those skilled in the art.

It will be noted from FIG. 2 that an angular displacement of the free end of the Bourdon tube by an angle $\theta$ will produce a corresponding angular rotation of mirror 27. But as will be apparent hereinbelow, inasmuch as the angular rotation of mirror 27 is measured by the reflection of a light beam impinged upon mirror 27, a rotation of the mirror by an amount corresponding to angle $\theta$ will result in reflected beam B being reflected at an angle $2\theta$ from the source light beam A. Thus, the "output" in the form of mirror deflection is multiplied thus increasing the sensitivity of the device.

The angular movement of mirror 27 is detected and measured by a mechanism including light source 33 and a series of photocells 30. The light source 33 is fixedly mounted with respect to the frame of the unit so that it does not rotate with the mirror or the photocells. The mounting details for light source 33 will be further set forth below.

Advantageously, light source 33 suitably includes a combination of condensing lenses to collimate the source light beam to produce a well-defined spot or bar of light focused at the distance of the photocells from the light source 33. Alternatively, a focusing mirror could be used.

The photocells 30 are arranged as adjacent chords of a circle extending in a curved fashion on rotatable table 37. The light-sensitive cells are preferably photovoltaic silicon cells which are matched for sensitivity and temperature characteristics. The cells at one end of the bank of photosensitive cells, such as at 32, produce a positive signal when impinged by a light beam, while the cells at the opposite end 31 produce a negative signal.

The cells, as indicated above, are secured to rotary table 37 which is mounted to the frame of the unit by a bearing arrangement so that it will rotate about axis 100 which is directly below rod 29 and the center of rotation of mirror 27 and corresponds to the axis of the Bourdon tube. The table is a pie-shaped segment supporting a bank of photocells defining an angle of about 110° since it is desirable that mirror 27 not rotate more than about 50° or so for full scale pressure measurement, though this angle of deflection is not at all critical to the operation of the device. The outer edge of rotatable table 37 provided with gear teeth 41, which gear teeth engage a worm 43. The worm is mounted on shaft 45 which passes through bearings 47 which are suitably mounted to the frame of the apparatus. The upper end of the shaft as illustrated is connected through a reduction gear arrangement 49 to servo motor 51. Servo motor 51 is in turn controlled by servo amplifier 53 which has as its input the differential output of the photocells in bank 30. Accordingly, when a pressure is applied to Bourdon tube 12, the deflection of the mirror will produce a differential output from the photocells which will cause servo motor 51 to drive rotatable table 37 until the impinging light beam again produces a null reading, i.e., a differential output of zero from the photocells.

In the condition of zero pressure differential across the walls of the Bourdon tube, the mirror may be perpendicular to impinging light beam A. Alternatively, the "rest" position of the mirror may be at an angle to the impinging light beam such that the perpendicular condition of the mirror occurs at about mid-range of the instrument. As the pressure differential is applied across the Bourdon tube, mirror 27 rotates to an angle $\theta$ from its original position and, while the impinging source light beam A remains fixed, the reflected beam B rotates to an angle $2\theta$ from the original reflected beam. The reflected beam subtends an arc which is equal to $2\theta$ radians. The reflected beam is intercepted by photocells 30 at a point displaced from the null reading position causing a differential output to be transmitted through servo amplifier 53 and further causing servo motor 51 to drive table 37 to once again drive the photocells to produce a null reading. The lower end of shaft 45 as illustrated in FIG. 1 is accordingly linked to a digital output scale 67 which produces a digital readout corresponding to the angle $2\theta$ subtended by the reflected light beam. A suitable transformer or solid state circuitry is used to create a constant voltage input to the lamp to regulate the intensity of the beam from lamp 33 to keep the light intensity therefrom substantially constant. Light intensity variations resulting from voltage fluctuations can produce changes in the null reading position and introduce error into measurement. By controlling light intensity as well as utilizing matched photocells, the possibility of error in this regard is substantially reduced.

With reference now to FIGS. 4 and 5, the structure of the precision manometer apparatus in accordance with this invention is shown in greater detail. FIG. 4 is a side view of a portion of the apparatus of this invention illustrating the means for positioning the Bourdon tube-containing cylinder 13 within the entire apparatus. Cylinder mount 55 is fixedly mounted on upper support plate 57. In turn, support plate 57 is anchored with screws 59 to the upwardly extending support arms 61 of frame 60. Suitable lock washers or the like (not shown) are desirably provided on screws 59. The holes through upper support plate 57 for screws 59 permit limited movement of the support plate with respect to the frame 60. A total movement of about 20 to 50 thousandths of an inch in each direction is generally sufficient. Captive screws 63 extending upwardly through end plate 15 of the cylinder assembly secure the Bourdon tube cylinder 13 in cylinder mount 55 permitting the substitution of one cylinder for another. Varying Bourdon tube springs are available to give pressure responses within different ranges, i.e., 0-to-100 psi, 0-to-1,000 psi, etc. However, it will be understood that the following calibration of the instrument as described hereinbelow, cylinders may be substituted but the replacement cylinders will not produce direct readings.

Light 33 is mounted in fixed position on the underside of support plate 57 so that the limited movements of the support plate, as will be explained below, result in a similar movement of the light source, thus preserving the position of the light source with respect to the mirror 27 at all times. In the method of this invention, it will be understood that movement of the light source around a fixed mirror would effect a result similar to movement of the mirror relative to a fixed light source. In the manometer, however, such a construction is not preferred.

Light 33 is held in a suitable positioning means 67 which directs the light beam at an angle downwardly toward mirror 27. Collimating lenses 71 are positioned in the forward part of means 67 to focus the beam of light at the distance of the photocells.

Housing 73 is mounted atop upper support plate 57 and may contain a voltage source for lamp 33 and a servo motor 51. The servo motor drives pulley 75 and contains chain 77 which in turn drives shaft 45. As described above, shaft 45 carries worm 43 which drives gear plate 37 to bring the photocells to a null position upon rotation of the mirror following an applied pressure.

Heater 51 surrounds cylinder 55 for purposes of controlling the heat of the Bourdon tube pressure gauge within cylinder 13. Any suitable heater such as a wire resistance heater around the exterior of cylinder 13 or the like may be used. While the temperature effect on fused quartz is small and less than a similar effect on other materials which might be used to measure pressure (e.g., the effect on quartz is less than the effect on the density of mercury in a mercury manometer), the error introduced by temperature effect cannot be considered negligible because of the extreme precision of the instrument. Accordingly, it is desirable to control the temperature of the Bourdon tube monometer by means of a suitable closed loop temperature controlling circuit 70 which uses a controlling thermistor of the like. Heater circuit 70 is mounted on support arms 61.

The temperature of the quartz Bourdon tube may be measured with a mercury-in-glass thermometer 81, a thermistor probe or the like. The thermometer illustrated is maintained in a heat conductive envelope 83 extending from end plate 15. The bulb of the thermometer is preferebly placed proximate the exterior of the Bourbon tube. When measurements are taken, the temperature of the quartz Bourdon tube is accordingly easily measured and for greatest accuracy, pressure measurements should be taken at a temperature corresponding to the calibration temperature of the instrument.

Gear plate 37 is provided to suitably rotate with respect to frame 60 by means of pin 93 which extends through plate 37 and is fastened to the frame 60 by bolt 95 which is bearing mounted at 96. Table 97 fixedly mounted to and disposed immediately beneath gear plate 37 is provided with bearings 98 about its periphery to permit smooth rotation of gear plate 37.

When chain 77 from the servo motor drives shaft 101, as seen in FIG. 5A, gear 99 provides a reduced rotation to shaft 45 through gear teeth 103. Shaft 101 is provided with bearings 48 as it is mounted through frame 60 similarly to the bearings 47 provided with respect to shaft 45. Bevelled gear 81 at the end of shaft 101 engages bevelled gear 83 which in turn drives counter 67. Spring 105 is maintained on shaft 101 behind stop 106, accordingly enabling the operator to disengage gear 81 from gear 83 by pushing inwardly on shaft 101. This permits setting of counter 90 to zero for any given position of plate 37.

Since counter 90 responds only to the number of revolutions of gear 83, it will be understood that the full scale count of the instrument can be varied by simply varying the gear ratios between gears 81 and 83. For example, an instrument having a range of zero to 100 psi or of zero to 10 psi would be set up to produce 100,000 counts on counter 90 at full scale. On the other hand, an instrument having a range of zero to 200 psi would more desirably produce 200,000 counts on the counter at full scale. The number of counts on the counter produced by a given rotation of gear 81 can be altered by altering the gear ratio between gear 81 and gear 83.

With reference now to FIG. 6, the photocell assembly 30 is shown. The photocells such as 31 and 32 are mounted on stand 111 which has chordal surfaces facing inwardly toward mirror 27. Conductive band 109 is a printed circuit strip which is fastened to photocell stand 111 by means of screws 110 and is electrically connected to the photocells. Suitable brackets 113 are provided on the interior of stand 111 to enable fastening of the stand and the photocell assembly to plate 37.

With reference now to FIG. 7, the photocell assembly is shown in section indicating the relative position of the mirror to the photocells. It will be noticed that mirror 27 at the end of the Bourdon tube 12 is positioned slightly above the plane of the photocells so that the downward inclined beam from light source 33 will strike the photocells squarely. The angle between the incident beam from light source 33 and the reflected beam in the vertical plane has no significance in the measurements of this invention or in the calibration procedure explained below. Accordingly, although it will be understood that the reflected beam defines an angle with respect to the incident beam from light source 33 in a vertical plane, this angle in the vertical plane has no effect on the measurement taken with the novel manometer of this invention.

Normally, in the construction of quartz manometer Bourdon tubes, it has been the practice to align the center of rotation of mirror 27 with the axis of the Bourdon tube 12 and to dispose the center of the mirror and the axis of the Bourdon tube directly above the center of rotation of plate 37 indicated in FIG. 1 at 100. It has further been the practice to dispose the photocells so that they substantially define the arc of a circle, such as circle 115 shown in FIG. 6 about the point 100. By this arrangement, the arc subtended by the reflected beam from the incident beam striking the mirror will have a length equal to $2\theta$ radians and accordingly that arc subtended will be a direct measurement of the angle of deflection of the mirror upon the application of a pressure differential across the Bourdon tube. But, as discussed above, the response of the Bourdon tube is not linear and consequently correction factors must be applied in order to make the pressure manometers direct reading instruments.

The novel manometer of this invention is so constructed that the response of the instrument can be calibrated to be substantially linear over its entire range within acceptable limits of error. This is accomplished by moving the mirror away from the center of the arc around which the photocells rotate.

The novel manometer of this invention is constructed so that sealed cylinder 13 containing Bourdon tube 12 is mounted solely on support plate 57 whereas the photocell assembly and plate 37 are fixedly mounted with resepct to frame 60. Accordingly, by movement of support plate 57 with respect to frame 60, the Bourdon tube mirror may be moved in any direction thereby displacing the axis of the Bourdon tube and the center of the mirror from center of rotation 100 of the support plate 37. Since light source 33 is also mounted with respect to support plate 57, this adjustment does not in any way effect the relationship between the source of the incoming light beam and the mirror.

With reference now to the FIGS. 8A, 8B, and 8C, the method by which the novel manometers of this invention may be calibrated to give substantially linear response will be illustrated. With particular reference to FIGS. 8A through 8C, there is illustrated schematically the response which would be generated by one type of manometer in accordance with the instant invention. Manometers in accordance with the instant invention may be absolute (in which case the Bourdon tube is evacuated) or bi-directional in which case their deflection would indicate a departure of a pressure to be measured above or below a reference pressure. In the manometers schematically illustrated in FIGS. 8A through 8C, a light source 33 is disposed behind a bank of photoelectric cells illustrated schematically at 120. Since the position at which the reflected beam from the mirror intercepts th photocells is directly related to the readout on the counter 90, in these figures, the arrangement of photocells has been represented as a readout scale. 100 indicates the geometric center around which the photoelectric cells rotate.

In FIG. 8A, when impinging light beam A strikes the mirror disposed directly over point 100 at zero pressure, reflected beam B is reflected from the mirror and would be intercepted by the photocells at point $r$. Thus, point $r$ would correspond to zero actual differential pressure and by virtue of the zero adjust features of the manometer, could be adjusted to reflect a reading of zero pressure. However, assuming a zero-to-100 psi range for the Bourdon tube illustrated in FIGS. 8A through 8C, at 100 pounds pressure differential across the Bourdon tube, the mirror is deflected in a counterclockwise direction and produces reflected beam $B_1$ which is intercepted by the photocells at point $t$. However, because the range has not been adjusted, the arc subtended between point $r$ and point $t$ produces a reading which does not correspond to 100 psi, but rather corresponds to a reading possibly somewhat greater than 100 psi, say 100.50 psi. In such an instance, it can be appreciated that in order to produce a reading of 100 at an actual pressure of 100 psi, the reflected beam at 100 psi would in fact have to subtend a lesser arc than the art $rt$, and be intercepted by the photocells at point $\mu$. To produce a deflection necessary to subtend the arc $ru$, it is necessary to reduce the pressure to less than 100 psi. A similar nonlinearity would exist at 50 psi where, for example, reflected beam C would subtend arc $rv$ and give a reading somewhat greater than 50 psi. This is the phenomenon observed in virtually any other type of Bourdon tube manometer.

Initially, in calibrating the instruments in this invention, it is desired to adjust the range of the instrument, i.e., provide that the instrument reads properly at the limits of the range to be measured, so that at zero pressure a reading of zero pressure will be obtained from the instrument and that at 100 psi, if such is the range, a reading of 100 psi will be obtained from the instrument.

The instrument will produce a reading of 100 psi of the reflected beam intercepts the photocells to subtend an arc equal to arc $ru$. Since arc $ru$ is smaller than the arc actually subtended by the reflected beam when 100 psi is across the instrument, this adjustment of range can be accomplished by moving the mirror along the light beam toward the photocells which intercept the light beam. As the mirror is moved forwardly, the length of the arc subtended by the reflected beams B and $B_1$ is shortened while the angle of deflection produced by these various pressures remains the same. Thus, for example, in FIG. 8B, the center of Bourdon tube is moved toward the photocells by a distance $d$ to point 101 by an amount sufficient so that the arc subtended by the reflected light beams from the mirror is equal to the arc $ru$. As the center of the mirror is moved forwardly by a distance $d$ such that the deflection produced by 100 psi will also produce a total deflection subtending an arc equal to $ru$, the instrument will be linear at zero psi and at 100 psi despite the fact that the mirror is no longer over the center of rotation of the photocells. In FIG. 8B the same impinging light beam A at zero psi yields reflected beam $B_3$ which is intercepted at point $w$ by the photocells. The zero adjust mechanism on the manometer permits the operator to adjust the readout to be zero at point $w$ as easily as at point $r$ and consequently the instrument gives a proper readout at this point. At 100 psi, reflected beam $B_4$ would be intercepted by the photocell at point $x$ such that the entire arc $wx$ subtended between zero psi and 100 psi is equal to the arc $ru$. Since the magnitude of the instrument readout is dependent upon the size of the arc subtended by the photocells to intercept the reflected beams, the adjustment of the mirror by distance $d$ will produce a reading of 100 psi when reflected beam $B_4$ is intercepted at point $x$. The instrument is therefore adjusted for linear response at the extremes of the range, i.e., at zero pressure and at 100 psi the instrument reads correctly.

To increase the range, the adjustment is made by rearward movement of the mirror. Thus, of originally a 100 psi reference pressure gives a reading less than 100 psi, a rearward adjustment would be indicated.

However, inasmuch as this adjustment takes place by merely moving the mirror parallel to incoming beam A, the movement has very little effect on the nonlinearity of the instrument in the mid-range. In FIG. 8B, the application of 50 psi still gives a reading greater than 50 psi as shown by reflected beam $B_5$, although 100 psi actual pressure produces a 100 psi reading. In fact, if a plot is made of actual pressure against instrument response such as shown in FIG. 9, it will be seen that the instrument reads correctly at zero psi and at 100 psi, but that the instrument is substantially nonlinear in the mid-range. Most commonly, the greatest nonlinearity, i.e., the greatest difference between actual pressure and readout pressure exists at about the middle of the preselected range, between about 40 percent and 60 percent of the full scale reading. Graphically, in FIG. 9, dotted line OPL represents a substantially linear response whereas the curve OQL represents actual response. It can be seen that the maximum differential $m$ exists in the neighborhood of the midrange, at about 50 psi. This nonlinearity of response might exist in other areas and be biased toward one end of the range.

After the instrument is adjusted for a range by moving the mirror forwardly or rearwardly and parallel to the light beam, the instrument is further adjusted for accurate readout in the mid-range by moving the mirror transversely to the incoming light beam as shown in FIG. 8C. Thus, for example, by further adjusting the mirror slightly to the left to point 102 as shown in FIG. 8C, the instrument can be substantially linearized in the mid-range. The transverse movement of the mirror is undertaken and accomplished while simultaneously preserving the length of the arc subtended at full scale. Accordingly, in FIG. 8C, it can be seen that at zero psi impinging light beam A reflects beam $B_6$ which gives a readout of zero psi, at 50 psi reflects beam $B_7$ which gives a readout of 50 psi, and at 100 psi reflects beam $B_8$ which gives a readout of 100 psi.

It will also be apparent to those skilled in the art that as the mirror is moved transversely in order to obtain a linear readout in the mid-range, it may be necessary to further move the mirror slightly in a direction towards the light sensitive detector while moving it transversely, in order to preserve the size of the arc subtended at the upper limit of the range. Inasmuch as transverse movement displaces the center of rotation of the mirror off of a radius around which table 37 rotates, it will be understood that any transverse movement generally might slightly change the size of the arc which would be subtended at the upper limit of the range. The mirror is therefore ideally moved transversely along an arcuate path 104. However, with the amount of transverse movement here referred to, the amount of change is minimal. Upon acquisition of exerpience in linearizing instruments in accordance with this invention, both movements may be effected simultaneously and any additional movement parallel to the light beam which might desirably be accomplished together with the transverse movement of the mirror is accomplished in the same operation.

In actual practice, linearization of the instrument in accordance with the method of this invention is accomplished by measuring the actual range of the instrument and adjusting the size of the arc subtended to produce a response on the instrument equal to the desired range. Movement of the mirror in this adjustment is away from the light source to increase the range and toward the light source to decrease the range of the instrument. Generally, an adjustment of 0.020 inch is sufficient to change the range by an amount corresponding to 0.15 percent of the full scale reading (0.15 psi in the case of a 100 psi range).

Following the adjustment of the range, the linearity of the instrument is measured, typically by preparing a plot such as illustrated in FIG. 9. The mirror is adjusted in a direction transverse to the original light beam in order to obtain a linear response in the most nonlinear region as may be determined from the plot. Generally, a movement of about 0.030 inch perpendicular to the light beam A will result in a change in reading of about 0.4 percent of full scale reading in the mid-range of the instruments of the type described. The mirror adjustment is effected by adjusting plate 57 which moves the mirror and lamp.

The adjustment is accomplished by loosening screws 59 which hold support plate 57 to frame 60. Preferably, some type of adjustment mechanism is clamped to the leg 61 of frame 60 and the movement of the support plate may be accomplished by insertion of a series of measured pieces, in the nature of feeler gauges to effect the desired movement. The devices of this invention are nonlinear by an amount corresponding to about 0.5 percent of full scale. The range adjustment with a quartz helix varies with each spring member and consequently it may be necessay to increase or decrease the range by moving the mirror away from or closer to the photocells. However, the deflection of quartz helix at about 50 percent of full scale is almost usually too much, and accordingly compensation to linearize this response is almost invariably negative (i.e., movement of the mirror toward the zero side of the scale). But if the response of the Bourdon tube at 50 psi is low, an adjustment to the higher side of the scale would be indicated.

It is pointed out that the linear response referred to herein is a linear response between the reading of the instrument and the actual condition being measured. In all cases it would be desirable to achieve such a readout so that an instrument could be made direct reading. It will therefore be recognized that the method of this invention may be employed to generate a direct response of an instrument to a nonlinear parameter to be measured.

Once support plate 57 has been positioned by means of feeler gauges or the like to give substantially linear response, screws 59 are tightened with suitable lock washers in place in order to lock the support plate with respect to frame 60. If desired, however, lockable vernier screws could be provided to mount the support plate 57 on frame 60 and thereby permit the establishment of various positions for linear response of various Bourdon tubes thereby permitting the operator to interchange Bourdon tubes in the manometer.

The method of this invention may be practiced in other ways as will be obvious to those skilled in the art. Upon initial calibration of the manometer in accordance with this invention, an operator, cognizant of the novel method of this invention, can begin adjustment of the Bourdon tube by moving it simultaneously forwardly or rearwardly of the center of rotation of the photocells and simultaneously adjust the Bourdon tube transversely with respect to that center of rotation. Adjustments must be made on a trial and error basis, and perhaps several adjustments both parallel and transverse to the light beam might be required. Once experince is obtained by adjusting a Bourdon tube manometer in accordance with the method of this invention, it will become possible for an operator to estimate fairly closely the direction and extent of movement which will be necessary to achieve substantial linearity in the instrument.

With respect to the novel manometer construction of this invention, it will be apparent to those skilled in the art that a number of various servo mechanisms, drive systems, pressure fittings and the like may be adapted to manometers in accordance with this invention, and that the details of construction of the embodiments shown are not critical. Indeed it is only necessary in accordance with this invention to provide the Bourdon tube mount with a means whereby it is adjustable with respect to the center of rotation of the photocells. It is also desirable in accordance with this invention to similarly mount the lamp directing the source beam at the Bourdon tube mirror with the Bourdon tube so that this relationship is preserved.

It is further pointed out that generally once the range of the instrument has been established, it is typically necessary only to linearize the instrument at one additional point in order to obtain an optimum direct reading response over the entire preselected range. Further attempts to linearize the response of the instrument at additional points while trying to maintain the linear response of the instrument at the zero point, the upper limit of the range, and at the mid-range is extremely difficult and generally should not be attempted.

Although the method of this invention has been specifically discussed with respect to a Bourdon tube pressure measuring device, it will be apparent that a number of instruments having optical readout systems can be calibrated for linear response in a similar fashion. Thus, for example, temperature measuring devices can utilize bimetallic temperature-sensitive spirals. An optical readout whereby the arc subtended by a light beam reflected from a mirror suspended from the bimetallic element would operate similarly to the manometer described and could be similarly adjusted for linearity.

Hence, this invention comprehends adjusting the range and calibrating any such digitally reading instrument for a linear response over a preselected range. It is necessary only that the instrument have a transducer, i.e., a member which provides a physical response functionally related in magnitude to the condition to be measured (be it temperature, pressure, electromagnetic field, etc.) to produce a deflection of a reflector means, and includes a light source for directing a beam of light at the reflector, a light sensor means for detecting the arc subtended by the reflected beam. The readout of such a measuring instrument can be calibrated for substantially linear response over a preselected range of values measuring the condition. The method is accomplished by initially applying to the transducer a first reference condition of predetermined magnitude corresponding to the upper limit of said range, detecting the arc subtended by the reflected beam from the reflector means as a result of application of said first reference condition, moving said mirror parallel to the source light beam to change the size of the arc subtended by the reflected beam intercepted on the light sensor to produce an accurate readout corresponding to said first reference condition, applying a second reference condition of predetermined magnitude within said preselected range at which the readout differs substantially from the magnitude of the second reference condition, and moving said mirror transversely to the direction of the source beam while preserving the size of the arc subtended by the first reference condition to produce an accurate readout at said second reference condition. The application of this method to various instruments having reflected-beam optical response systems including those wherein mirror deflection is produced by a deflecting spiral, by a twisting filament or the like will be understood by those skilled in the art. The method of this invention is useful in calibrating those instruments having transducers which produce nonlinear response to the condition to be measured and from which a substantially linear response is desired. If a completely linear-responding transducer can be utilized, of course, the device can be made direct reading by conventional methods. On the other hand, if an instrument's response is not substantially linear, e.g., if the transducer has an exponential response, linearization over a significant range cannot be achieved.

What is claimed is:

1. A precision pressure measuring device comprising:
   a frame;
   a pressure responsive transducer adapted to produce a movement functionally related to the magnitude of a differential pressure applied thereto;
   a reflector means mounted with respect to said transducer for rotary deflection in response to said movement of said transducer;
   a fixed position light source for impringing a light beam on said reflector means;
   a light sensing means rotatably mounted with respect to said frame for detecting the length of the arc subtended by a reflected beam from said reflector means upon application of a differential pressure across said transducer; and
   means mounting said transducer with respect to said frame to permit selective movement of said reflector means in direction parallel and traverse to said light beam.

2. The measuring device of claim 1 wherein said transducer comprises a helical pressure gauge having a fixed end and a free end wherein said reflector means is mounted on said free end of said pressure gauge.

3. The measuring device of claim 2 wherein said pressure gauge is a helical quartz Bourdon tube.

4. The measuring device of claim 1 wherein said light source if fixedly mounted on said means mounting said transducer to maintain said light source fixed position relative to said transducer.

5. In a Bourdon tube precision manometer apparatus wherein pressure is measured by applying a pressure differential across the walls of Bourdon tube pressure gauge and detecting the deflection of the free end of said Bourdon tube pressure gauge by an optical apparatus including fixed light source for impinging a source light beam upon a mirror suspended from the free end of said Bourdon tube pressure gauge and further including a rotatable light sensitive detector to intercept the light beam reflected from said mirror, the improvement which comprises:
   a frame member;

means mounting said light sensitive means on said frame member for rotatable movement with respect thereto; and means mounting said said Bourdon tube pressure gauge with respect to said frame to permit selective movement of said mirror in directions parallel and traverse to said source light beam to enable adjustment of the size of the arc subtended by the reflected beam from the said mirror at preselected pressure.

6. The apparatus of claim 5 including the further improvement comprising:

means fixedly mounting said light source on said means mounting said transducer to maintain said light source in fixed position relative to said transducer.

* * * * *

PO-1050
(5/69)

UNITED STATES PATENT OFFICE
CERTIFICATE OF CORRECTION

Patent No. 3,780,589     Dated December 25, 1973

Inventor(s) Jerry L. Fruit

It is certified that error appears in the above-identified patent and that said Letters Patent are hereby corrected as shown below:

Column 1, line 12, change "ventin" to --vention.
Column 4, line 26, change "showwng" to --showing.
Column 7, line 60, change "monometer" to --manometer.
Column 9, line 52, change "th" to --the.
Column 10, line 11, change "art" to --arc.
Column 14, line 53, change "if" to --is.

Signed and sealed this 13th day of August 1974.

(SEAL)
Attest:

McCOY M. GIBSON, JR.
Attesting Officer

C. MARSHALL DANN
Commissioner of Patents